United States Patent
Kurihara et al.

(10) Patent No.: US 7,009,017 B2
(45) Date of Patent: Mar. 7, 2006

(54) FLUORINATED TERPOLYMER

(75) Inventors: Satoshi Kurihara, Kitaibaraki (JP);
Daisuke Fujihara, Kitaibaraki (JP);
Takashi Enokida, Kitaibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 0 days.

(21) Appl. No.: 10/472,851

(22) PCT Filed: Dec. 12, 2002

(86) PCT No.: PCT/JP02/13233

§ 371 (c)(1),
(2), (4) Date: Sep. 24, 2003

(87) PCT Pub. No.: WO03/051944

PCT Pub. Date: Jun. 26, 2003

(65) Prior Publication Data

US 2004/0214972 A1    Oct. 28, 2004

(30) Foreign Application Priority Data

Dec. 18, 2001  (JP) ............................. 2001-383974
Jun. 5, 2002   (JP) ............................. 2002-163741

(51) Int. Cl.
*C08F 214/26*    (2006.01)
(52) U.S. Cl. ...................... 526/247; 525/200; 525/199
(58) Field of Classification Search ................ 526/247; 525/200, 199
See application file for complete search history.

(56) References Cited

U.S. PATENT DOCUMENTS

| | | | | |
|---|---|---|---|---|
| 4,029,868 A | * | 6/1977 | Carlson | 526/247 |
| 5,461,129 A | * | 10/1995 | Kurihara et al. | 526/247 |
| 5,463,006 A | * | 10/1995 | Abusleme et al. | 526/247 |
| 6,426,386 B1 | * | 7/2002 | Lee et al. | 525/199 |
| 2001/0018493 A1 | | 8/2001 | Lee et al. | 525/200 |

FOREIGN PATENT DOCUMENTS

| | | | |
|---|---|---|---|
| EP | 0 759 446 A1 | | 2/1996 |
| EP | 0925314 B1 | * | 11/2001 |
| EP | 1457505 | * | 9/2004 |
| JP | 52-109588 | * | 9/1977 |
| JP | 7-126329 | * | 5/1995 |
| JP | 7-304832 | * | 11/1995 |
| JP | 9-52920 A1 | * | 2/1997 |
| JP | 2001-214019 | * | 8/2001 |
| JP | 2002-295450 | | 9/2002 |
| WO | WO-03/051944 A1 | * | 6/2003 |

OTHER PUBLICATIONS

JP-2002-295,450 Oct. 2002 JP Kurihara et al.*
EP-759,446 A1 Feb. 1997 EP Blair.*

* cited by examiner

Primary Examiner—David W. Wu
Assistant Examiner—Henry S. Hu

(57) ABSTRACT

A fluorine-containing terpolymer with distinguished transparency and strength at ordinary temperature and at elevated temperatures when heated, which comprises 20–98% by weight of tetrafluoroethylene, 1–40% by weight of perfluoro (ethyl vinyl ether) and 1–40% by weight of perfluoro(propyl vinyl ether) and has a specific melt viscosity of $0.1 \times 10^3 – 110 \times 10^3$ Pa·s (372° C.). The fluorine-containing terpolymer preferably has a comonomer ratio of perfluoro (propyl vinyl ether) to perfluoro(ethyl vinyl ether) of 1.0 or more by weight.

6 Claims, No Drawings

FLUORINATED TERPOLYMER

TECHNICAL FIELD

The present invention relates to a fluorine-containing terpolymer, and more particularly to a terpolymer of tetrafluoroethylene-perfluoro(alkyl vinyl ether) series with distinguished transparency and strength at both ordinary temperature and elevated temperature when heated.

BACKGROUND ART

Various tetrafluoroethylene-perfluoro(alkyl vinyl ether) copolymers have been so far well known, and particularly tetrafluoroethylene-perfluoro(methyl vinyl ether) copolymer and tetrafluoroethylene-perfluoro(propyl vinyl ether) copolymer have been in popular use.

In the case of tetrafluoroethylene-perfluoro(methyl vinyl ether) copolymer, the copolymerizability of perfluoro(methyl vinyl ether) with tetrafluoroethylene is satisfactory, but the intermolecular interaction of side chain methoxy groups per se of the copolymer is so weak that it is difficult to obtain moldings with a satisfactory mechanical strength. That is, when compared with tetrafluoroethylene-perfluoro(propyl vinyl ether) copolymer, the mechanical strength is not better under the conditions of the same perfluoro(alkyl vinyl ether) content and the same specific melt viscosity.

In the case of tetrafluoroethylene-perfluoro(propyl vinyl ether) copolymer, on the other hand, the copolymerizability of perfluoro(propyl vinyl ether) with tetrafluoroethylene is so low that it is difficult to increase the copolymerization ratio of perfluoro(propyl vinyl ether), and thus copolymers with about 3 wt. % perfluoro(propyl vinyl ether) content are commonly used. Therefore, the copolymer has a distinguished chemical stability, but has a poor transparency due to the crystallinity.

Even if the comonomer content of perfluoro(propyl vinyl ether) in the copolymer could be increased to about 16 wt. %, the composition would become heterogeneous because of the low copolimerizability of the vinyl ether with the tetrafluoroethylene, and also the molecular weight would not be increased. Thus, it is difficult to obtain moldings with satisfactory mechanical strength and distinguished transparency.

It is well known that tetrafluoroethylene-perfluoro(ethyl vinyl ether) copolymer has distinguished transparency and flex fatigue resistance.

As disclosed in Examples of JP-B-48-20788, the copolymer with satisfactory mechanical strength cannot be obtained, when the comonomer content of perfluoro(ethyl vinyl ether) in the copolymer is not more than 3 wt. %. This means that in the case of a low comonomer content of perfluoro(ethyl vinyl ether) the intermolecular interaction of side chain ethoxy groups per se of the copolymer is so weak that no satisfactory mechanical strength can be obtained.

Also, as disclosed in Examples of JP-A-7-126329, even if the comonomer content of perfluoro(ethyl vinyl ether) is 7 wt. % and the specific melt viscosity is high, no high mechanical strength can be obtained, though a high flex fatigue resistance can be obtained. This also means that in a range of low comonomer contents of perfluoro(ethyl vinyl ether) the contribution of side chain ethoxy groups to the main chain of the copolymer is so low that no satisfactory mechanical strength can be obtained.

WO 97-07147 discloses tetrafluoroethylene-perfluoro(ethyl vinyl ether) copolymer with a comonomer content above 17 wt. %, where softening takes place with a higher comonomer content of 17 wt. %, so that no copolymer with satisfactory mechanical strength will be obtained. In this case, the copolymer is produced by emulsion polymerization as in the case of the aforementioned JP-B-48-20788, and thus the molding is colored by coloring influences due to unstable terminal groups originating from residual emulsifier and ammonium persulfate, resulting in considerable transparency reduction.

Furthermore, JP-A-2001-500906 discloses an improvement of transparency by increasing the comonomer content of perfluoro(ethyl vinyl ether) to 38 wt. % or more, but no satisfactory mechanical strength is obtained. In this case, the copolymer is produced by emulsion polymerization, and thus the afore-mentioned disadvantage is unavoidable. A terpolymer of tetrafluoroethylene-perfluoro(ethyl vinyl ether)-perfluoro(methyl vinyl ether) is also disclosed in the aforementioned JP-A-2001-500906 publication. Also, in this case, the intermolecular interaction of side chain methoxy groups per se of the terpolymer is so weak that the contribution of the third monomer perfluoro(methyl vinyl ether), even with 18 wt. % comonomer content, to an increase in the mechanical strength is not observable, or rather the mechanical strength is deteriorated.

That is, in the case of copolymer of tetrafluoroethylene with perfluoro(propyl vinyl ether), perfluoro(ethyl vinyl ether) or perfluoro(methyl vinyl ether), it is difficult to obtain distinguished transparency and mechanical strength at the same time.

DISCLOSURE OF THE INVENTION

An object of the present invention is to provide a copolymer of tetrafluoroethylene with perfluoro(alkyl vinyl ethers) with distinguished transparency and mechanical strength at both ordinary temperature and elevated temperature when heated.

Such an object of the present invention can be attained by a fluorine-containing terpolymer, which comprises 20–98 wt. % of tetrafluoroethylene, 1–40 wt. % of perfluoro(ethyl vinyl ether) and 1–40 wt. % of perfluoro(propyl vinyl ether) and has a specific melt viscosity of $0.1 \times 10^3$–$110 \times 10^3$ Pa·s (372° C.). The fluorine-containing terpolymer preferably has a comonomer ratio of perfluoro(propyl vinyl ether) to perfluoro(ethyl vinyl ether) of 1.0 or more by weight.

The fluorine-containing terpolymer comprises 20–98 wt. %, preferably 45–98 wt. %, of tetrafluoroethylene, 1–40 wt. %, preferably 1–25 wt. %, of perfluoro(ethyl vinyl ether) and 1–40 wt. %, preferably 1–30 wt. %, of perfluoro(propyl vinyl ether).

Below the afore-mentioned lower limit comonomer content of perfluoro(ethyl vinyl ether), the light transmittance will be lowered, whereas above the afore-mentioned upper limit comonomer content thereof the terpolymer will be softened and the mechanical strength will be lowered. Below the afore-mentioned lower limit content of perfluoro(propyl vinyl ether) the mechanical strength and the light transmittance will be lowered, whereas above the aforementioned upper limit content thereof the radical reactivity of perfluoro(propyl vinyl ether) toward tetrafluoroethylene will be lowered, resulting in poor copolymerizability, and thus the molecular weight of terpolymer per se and the mechanical strength will be lowered.

In the fluorine-containing terpolymer, a comonomer ratio of perfluoro (propyl vinyl ether) to perfluoro(ethyl vinyl ether) by weight is usually 0.2 or more, but when made to be preferably 1.0 or more, particularly preferably about 1.0—about 3.0, moldings with more distinguished tensile strength at break and light transmission property can be obtained. In the case the comonomer ratio is low, the terpolymer will have properties similar to those of binary copolymer of tetrafluoroethylene-perfluoro(ethyl vinyl ether), and the improvement effect on mechanical properties such as tensile strength at break, etc. will be not better.

Also, as to the moldability, it is preferable that a comonomer ratio of perfluoro(propyl vinyl ether) to perfluoro(ethyl vinyl ether) by weight is 1.0 or more, whereby a control effect on resin sagging problem as often observed in the molding of films or tubes will be remarkable. That is, when the molten resin is discharged from the nozzle, the molten state resin becomes less deformable with increasing the comonomer content of perfluoro(propyl vinyl ether), due to entanglement of side chain of perfluoropropoxy groups per se, resulting in remarkable contribution to uniform thickness of films or tubes.

Even in the melt fracture region (critical shear rate region), which can be observed by increasing the shear rate, it is preferable that the aforementioned comonomer ratio by weight in the terpolymer is made to be 1.0 or more. In the melt fracture region, the binary copolymer of tetrafluoroethylene-perfluoro(ethyl vinyl ether) or the terpolymer of tetrafluoroethylene-perfluoro(ethyl vinyl ether)-perfluoropropyl vinyl ether) in the aforementioned comonomer ratio of less than 1.0 by weight usually suffers from an unstable resin flow rate around the nozzle. It seems that such a phenomenon is due to disentanglement of side chains of the copolymer or the terpolymer under the high shear stress.

In the case that the present fluorine-containing terpolymer has a comonomer ratio of 1.0 or more by weight, on the other hand, the intermolecular slip can be suppressed by entanglement of side chain propoxy groups per se, thereby enabling the molten resin to be supplied at a constant flow rate with less resin fracture and contributing to reduction in surface exfoliation or occurrence of flow marks during molding of sheets, etc. by injection molding at a relatively high shear rate.

It is also necessary that the fluorine-containing terpolymer having the afore-mentioned terpolymer composition has a specific melt viscosity of $1.0 \times 10^3$–$110 \times 10^3$ Pa·s (372° C.). Below the lower limit specific melt viscosity, no satisfactory mechanical strength can be obtained, whereas above the upper limit specific melt viscosity the moldability will be considerably lowered. It is also desirable that the glass transition temperature is 20° C. or higher. When the glass transition temperature is below 20° C., the mechanical strength at room temperature will be lowered.

Copolymerization reaction of tetrafluoroethylene, perfluoro(ethyl vinyl ether) and perfluoro(propyl vinyl ether) can be carried out by solution polymerization, solution-suspension polymerization, etc., but solution-suspension polymerization using water as a medium is preferable from the viewpoint of conversion, removal of the heat of polymerization, coloring control of molding, etc. By solution-suspension polymerization, a comonomer ratio of perfluoro(propyl vinyl ether) having a low copolymerizability to tetrafluoroethylene can be effectively increased. That is, terpolymers with a higher comonomer content of the perfluoro(prolyl vinyl ether) can be obtained economically. This fact will be evident from the amounts of charged perfluoro (vinyl ether) and comonomer contents of the resulting copolymers or terpolymers given in the following Example 3 and Comparative Example 7.

Furthermore, the solution-suspension polymerization is more advantageous than the solution polymerization also in respect to fish eye control as a problem often encountered in molding of thin articles such as films, etc. It seems that the fish eye formation is caused by formation of polytetrafluoroethylene due to uneven polymerization between tetrafluoroethylene and perfluoro(alkyl vinyl ether). Fish eye control can be made to some extent by increasing the number of revolution per minute of the stirrer, but in the case of the solution polymerization it is difficult to control fish eye formation, because tetrafluoroethylene occupies most of the gas phase in the copolymerization reactor and in the case of solution polymerization the solvent serving as the copolymerization reaction zone is in direct contact with the gas phase, and tetrafluoroethylene radicals are formed due to reaction with the polymerization initiator from time to time. Furthermore, the solvent volume occupies 40–90% of the reactor vessel volume, and the polymerization solution becomes more viscous with progress of copolymerization reaction, resulting in further deterioration of stirring efficiency. Consequent lowering of contact frequency between the perfluoro(ethyl vinyl ether) radicals and the perfluoro (propyl vinyl ether) radicals will facilitate formation of polytetrafluoroethylene, i.e. fish eyes.

In the case of solution-suspension polymerization, on the other hand, most of the solvent serving as the copolymerization reaction zone is covered with water, and the boundary surface of gas phase tetrafluoroethylene is smaller than in the solution polymerization and also the solvent volume is one-third or less and the stirring effect is better than in the solution polymerization, resulting in higher contact frequency between the perfluoro(ethyl vinyl ether) radicals and the perfluoro(propyl vinyl ether) radicals and easier control of fish eye formation.

In the case of emulsion polymerization, on the other hand, the moldings will be colored by the influence of unstable terminal groups originating from the residual emulsifier and ammonium persulfate, resulting in considerable lowering of transparency.

In the solution-suspension polymerization, hydrochlorofluorocarbon, hydrofluorocarbon, perfluorocarbon, etc. are used as a water-insoluble or sparingly water-soluble solvent as so far used in mixture systems with water, among which hydrofluorocarbon or perfluorocarbon with a low ozone depletion coefficient is preferable from the viewpoint of global environmental pollution prevention. A mixing ratio of the solvent to water depends on polymerization temperature, polymerization pressure, an amount of perfluoro(alkyl vinyl ether) to be charged, etc.

A polymerization initiator of diacyl peroxide series is preferably used in the present invention. A chain-transfer agent for use in the present invention includes alcohols, hydrocarbons, halogenohydrocarbons, esters, ketones, etc., among which methanol is preferable.

Polymerization reaction is carried out preferably at a temperature of about 15° to about 80° C. under a pressure of about 0.3 to about 1.0 MPa. To maintain such a pressure condition, it is preferable to continuously or intermittently supply an additional charge of a mixture of the three monomer components after the initial charge of mixture of the three monomer components has been supplied. After the end of reaction, unreacted gases are purged from the pressure reactor vessel and then the reaction product mixture is withdrawn from the pressure reactor vessel, followed by washing and drying, thereby obtaining a desired fluorine-containing terpolymer.

BEST MODE FOR CARRYING OUT THE INVENTION

The present invention will be described in detail below, referring to Examples.

EXAMPLE 1

The following components were charged into a degassified stainless steel autoclave having a capacity of 3 liters with a stirrer:

| | |
|---|---|
| Desalted, deoxygenated water | 1,200 g |
| Perfluoro-n-heptane | 690 g |
| Perfluoro(ethyl vinyl ether) [FEVE] | 22 g |
| Perfluoro(propyl vinyl ether) [FPVE] | 26 g |
| Methanol | 0.1 g |

After elevation of the temperature to 30° C., 160 g of tetrafluoroethylene [TFE] was charged thereto until the pressure reached to 0.85 MPa. The initial charge composition had a comonomer ratio of TFE/FEVE/FPVE=77/10/13 (% by weight).

Then, 4.0 g of 25 wt. % isobutyryl peroxide solution in fluorinated hydrocarbon (CClF$_2$CF$_2$CHClF) was added thereto to initiate polymerization reaction. The pressure decreased with the progress of reaction, and thus TFE was additionally supplied thereto to maintain the polymerization pressure. In that case, FEVE and FPVE were also additionally supplied thereto in accordance to the total amount of supplied TFE so that a comonomer ratio of additionally supplied charge can be maintained at TFE/FEVE/FPVE=77/10/13 (% by weight).

When 300 g of TFE, 40 g of FEVE and 50 g of FPVE were charged in total, supply of TFE was discontinued, followed by aging. When the pressure reached to 0.5 MPa, unreacted gases were purged from the autoclave and then the resulting polymer was withdrawn from the autoclave, followed by drying under reduced pressure, water washing and drying, whereby 231 g of fluorine-containing terpolymer was obtained.

EXAMPLE 2

In Example 1, the amounts of comonomers in the initial charge were changed to 160 g of TFE, 130 g of FEVE and 150 g of FPVE, and the comonomer ratios of the initial charge and additionally supplied charge were maintained both at TFE/FEVE/FPVE=36/30/34 (% by weight). When 300 g of TFE, 250 g of FEVE and 280 g of FPVE were charged in total, supply of TFE was discontinued. 250 g of fluorine-containing terpolymer was obtained.

EXAMPLE 3

In Example 1, the amounts of comonomers in the initial charge were changed to 220 g of TFE, 330 g of FEVE and 370 g of FPVE, and the comonomer ratios of the initial charge and additional supplied charge were maintained both at TFE/FEVE/FPVE=24/36/40 (% by weight). When 300 g of TFE, 450 g of FEVE and 500 g of FPVE were charged in total, supply of TFE was discontinued. 186 g of fluorine-containing terpolymer was obtained.

EXAMPLE 4

In Example 1, the amounts of comonomers in the initial charge were changed to 260 g of TFE, 495 g of FEVE and 720 g of FPVE, and the comonomer ratios of the initial charge and additionally supplied charge were maintained both at TFE/FEVE/FPVE=18/33/49 (% by weight). When 300 g of TFE, 550 g of FEVE and 800 g of FPVE were charged in total, supply of TFE was discontinued. 161 g of fluorine-containing terpolymer was obtained. The amount of desalted, deoxygenated water was changed to 1,000 g.

EXAMPLE 5

The following components were charged into a degassified stainless steel autoclave having a capacity of 3 liters with a stirrer:

| | |
|---|---|
| Desalted, deoxygenated water | 400 g |
| Perfluoro-n-heptane | 690 g |
| FEVE | 870 g |
| FPVE | 1,400 g |
| Methanol | 0.1 g |

After elevation of the temperature to 30° C., 300 g of TFE was charged thereto until the pressure reached to 0.85 MPa. The composition of the charge had a comonomer ratio of TFE/FEVE/FPVE=12/34/54 (% by weight).

Then, 4.0 g of 25 wt. % isobutyryl peroxide solution in fluorinated hydrocarbon (CClF$_2$CF$_2$CHClF) was added thereto to initiate polymerization reaction. When the autoclave inside pressure reached to 0.5 MPa, unreacted gases were purged from the autoclave, and then the polymer was withdrawn from the autoclave, followed by drying in reduced pressure, water washing and drying, whereby 120 g of fluorine-containing terpolymer was obtained.

EXAMPLE 6

In Example 1, the amounts of comonomers in the initial charge were changed to 160 g of TFE, 96 g of FEVE and 48 g of FPVE, and the comonomer ratios of the initial charge and the additionally supplied charge were maintained both at TFE/FEVE/FPVE=53/32/15 (% by weight). When 300 g of TFE, 180 g of FEVE and 90 g of FPVE were charged in total, supply of TFE was discontinued. 280 g of fluorine-containing terpolymer was obtained.

EXAMPLE 7

In Example 1, the amounts of comonomers in the initial charge were changed to 180 g of TFE, 222 g of FEVE and 108 g of FPVE, and the comonomer ratios of the initial charge and additionally supplied charge were maintained both at TFE/FEVE/FPVE=35/44/21 (% by weight). When 300 g of TFE, 370 g of FEVE and 180 g of FPVE were charged in total, supply of TFE was discontinued. 283 g of fluorine-containing terpolymer was obtained.

EXAMPLE 8

In Example 1, the amounts of comonomers in the initial charge were changed to 200 g of TFE, 800 g of FEVE and 200 g of FPVE, and the comonomer ratios of the initial charge and additionally supplied charge were maintained both at TFE/FEVE/FPVE=17/67/16 (% by weight). When 300 g of TFE, 1,200 g of FEVE and 300 g of FPVE were charged in total, supply of TFE was discontinued. 243 g of fluorine-containing terpolymer was obtained.

EXAMPLE 9

In Example 1, the amounts of comonomers in the initial charge were changed to 500 g of TFE, 1,750 g of FEVE and 500 g of FPVE, and the comonomer ratios of the initial charge and additionally supplied charge were maintained both at TFE/FEVE/FPVE=10/70/20 (% by weight). When 300 g of TFE, 2,100 g of FEVE and 600 g of FPVE were charged in total, supply of TFE was discontinued. 184 g of fluorine-containing terpolymer was obtained. The amount of desalted, deoxygenated water was changed to 400 g.

COMPARATIVE EXAMPLE 1

In Example 1, copolymerization reaction was carried out without using FPVE, but only the amount of FEVE was changed to 50 g. 239 g of fluorine-containing binary copolymer was obtained.

COMPARATIVE EXAMPLE 2

In Example 2, copolymerization reaction was carried out without using FPVE, but only the amount of FEVE was changed to 300 g. 276 g of fluorine-containing binary copolymer was obtained.

COMPARATIVE EXAMPLE 3

In Example 3, copolymerization reaction was carried out without using FPVE, but only the amount of FEVE was changed to 650 g. 279 g of fluorine-containing copolymer was obtained.

COMPARATIVE EXAMPLE 4

In Example 4, copolymerization reaction was carried out without using FPVE, but only the amount of FEVE was changed to 1,600 g. 240 g of fluorine-containing binary copolymer was obtained.

COMPARATIVE EXAMPLE 5

In Example 1, the amounts of comonomer in the initial charge were changed to 250 g of TFE, 1,750 g of FEVE and 375 g of perfluoro(methyl vinyl ether) [FMVE], and the comonomer ratios of the initial charge and the additionally supplied charge were maintained both at TFE/FEVE/FMVE=10/74/16 (% by weight). When 300 g of TFE, 2,100 g of FEVE and 450 g of FMVE were charged in total, supply of TFE was discontinued. 176 g of fluorine-containing terpolymer was obtained. The amount of perfluoro-n-heptane was changed to 400 g.

COMPARATIVE EXAMPLE 6

The following components were charged into a degassified stainless steel autoclave having a capacity of 3 liters with a stirrer:

| | |
|---|---|
| Desalted, deoxygenated water | 1,200 g |
| Ammonium perfluorooctanoic acid | 15 g |
| FEVE | 8 g |
| Methanol | 0.3 g |

After elevation of the temperature to 50° C., 50 g of TFE was charged thereto until the pressure reached to 0.85 MPa. The initial charge composition had a ratio of TFE/FEVE=86/14 (% by weight).

Then, 0.5 g of ammonium persulfate was added thereto to initiate polymerization reaction. The pressure decreased with progress of reaction, and thus TFE was additionally supplied thereto to maintain the polymerization pressure. In that case, FEVE was additionally supplied thereto in accordance with total amount of the charged TFE to adjust the comonomer ratio of additionally supplied charge to TFE/FEVE=86/14 (% by weight).

When 300 g of TFE and 50 g of FEVE were charged in total, supply of TFE was discontinued, followed by ageing. When the pressure reached to 0.5 MPa, unreacted gases were purged from the autoclave, and then the polymerization liquid was withdrawn from the autoclave, followed by coagulation, water washing and drying, whereby 295 g of binary copolymer was obtained.

COMPARATIVE EXAMPLE 7

In Example 3, copolymerization reaction was carried out without using FEVE, but only the amount of FPVE was changed to 650 g. 175 g of fluorine-containing binary copolymer was obtained.

The fluorine-containing terpolymers and copolymers obtained in the foregoing Examples and Comparative Examples were subjected to determination of the following items:

Copolymer Composition (% by Weight):

FEVE and FPVE contents of TFE/FEVE/FPVE terpolymers were determined from the results of infrared absorption spectrum analysis according to the following equations FEVE=(net absorbancy at 9.17$\mu$/net absorbancy at 4.25$\mu$)×1.68+1.53

FPVE=(net absorbancy at 10.10$\mu$/net absorbancy at 4.25$\mu$)×0.98

FEVE content of TFE/FEVE binary copolymer was determined from the results of infrared absorption spectrum analysis according to the following equation FEVE=(net absorbancy at 9.17$\mu$/net absorbancy at 4.25$\mu$)×1.28+0.75

TFE, FEVE and FMVE contents of TFE/FEVE/FMVE terpolymers were determined with a solution of the terpolymer in hexafluorobenzene by calculating molar percentages (mol. %) from $^{19}$F-NMR chart integrated values (integrated values of main chain $CF_2$ for TFE, integrated values of $CF_3$ of FEVE origin for FEVE, and integrated values of $CF_3$ of FMVE origin for FMVE), and converting the molar percentages to weight percentages (wt. %)

Specific Melt Viscosity:

Determined with a melt indexer (made by Toyo Seiki Seisakusho K.K.) by placing the terpolymer into a cylinder, 9.5 mm in inner diameter, keeping the cylinder at 372° C. for 5 minutes, then extruding the terpolymer through an orifice, 2.095 mm in inner diameter and 8.00 mm long, under a piston load of 5 Kg, and dividing 53,150 by the extrusion rate value (g/minute) at that time to make the quotient as a specific melt viscosity Tensile Strength at Break:

Strengths at fracture at 20° C. and 150° C. at a pulling rate of 200 mm/minute were measured according to ASTM-D-1708

Light Transmittance:

Measured for 100µ m-thick films with ultraviolet-visible spectrophotometer (made by Nihon Spectrophotometer Mfg. Co.) at a wavelength of 250 nm or 650 nm Glass Transition Temperature:

With a viscoelastometer (made by Seiko Electron Co.), tan δ values were measured, where the maximum peak was made a glass transition temperature The results are given in the following Table 1 (for Examples) and Table 2 (for Comparative Examples).

TABLE 1

| | Example No. | | | | | | | | |
|---|---|---|---|---|---|---|---|---|---|
| Item | 1 | 2 | 3 | 4 | 5 | 6 | 7 | 8 | 9 |
| Copolymer composition | | | | | | | | | |
| FEVE (wt. %) | 2 | 7 | 13 | 17 | 25 | 12 | 18 | 31 | 39 |
| FPVE (wt. %) | 3 | 9 | 15 | 23 | 29 | 5 | 8 | 10 | 15 |
| Specific melt viscosity | | | | | | | | | |
| 372° C. (X $10^3$ Pa · s) | 11 | 9 | 2.2 | 1.3 | 1.4 | 9 | 2.1 | 1.2 | 1.1 |
| Tensile strength at break | | | | | | | | | |
| 20° C. (MPa) | 29 | 34 | 33 | 22 | 19 | 33 | 32 | 21 | 18 |
| 150° C. (MPa) | 16 | 18 | 6 | 4 | 2 | 17 | 5 | 3 | 1 |
| Light transmittance | | | | | | | | | |
| 250 nm (%) | 62 | 89 | 95 | 95 | 96 | 88 | 94 | 95 | 95 |
| 650 nm (%) | 92 | 94 | 96 | 97 | 97 | 94 | 96 | 97 | 97 |
| Glass transition temperature | | | | | | | | | |
| Max. tan δ peak (° C.) | 102 | 60 | 43 | 23 | 21 | 59 | 41 | 25 | 21 |

TABLE 2

| | Comparative Example No. | | | | | | |
|---|---|---|---|---|---|---|---|
| Item | 1 | 2 | 3 | 4 | 5 | 6 | 7 |
| Copolymer composition | | | | | | | |
| FEVE (wt. %) | 5 | 16 | 26 | 41 | 40 | 16 | 0 |
| FPVE (wt. %) | 0 | 0 | 0 | 0 | 0 | 0 | 16 |
| FMVE (wt. %) | 0 | 0 | 0 | 0 | 15 | 0 | 0 |
| Specific melt index | | | | | | | |
| 372° C. ((X $10^3$ Pa · s) | 11 | 11 | 2.3 | 1.3 | 1.0 | 11 | 0.5 |
| Tensile strength at break | | | | | | | |
| 20° C. (MPa) | 24 | 28 | 27 | 15 | 13 | 26 | 23 |
| 150° C. (MPa) | 13 | 14 | 3 | 1 | 0.4 | 13 | 10 |
| Light transmittance | | | | | | | |
| 250 nm (%) | 47 | 85 | 87 | 92 | 95 | 22 | 66 |
| 650 nm (%) | 90 | 92 | 93 | 94 | 97 | 76 | 89 |
| Glass transition temperature | | | | | | | |
| Max. tan δ peak (° C.) | 101 | 58 | 36 | 18 | 16 | 59 | 55 |

It is evident from the foregoing results that the TFE-FEVE binary copolymers have a maximum tensile strength at break when the FEVE content is 16 wt. %, and the tensile strength at break decreases when the FEVE is over 16 wt. % (Comparative Examples 2 to 4), but can be increased by copolymerization with FPVE (Examples 6 to 7). The TFE-FEVE-FPVE terpolymers are improved both in the tensile strength at break and transparency.

The fluorine-containing terpolymers obtained in Examples 3 and 7 and the fluorine-containing binary copolymer obtained in Comparative Example 3 were molded into films, tubes and injection sheets under the following conditions.

| (Film molding conditions) | Molding temperature | 260° C. |
|---|---|---|
| | Die clearance | 0.5 mm |
| | Die width | 120 mm |
| | Take-off speed | 0.2 m/min |

| (Tube molding conditions) | Molding temperature | 260° C. |
|---|---|---|
| | Die clearance | 18 mm (I.D), 26 mm (O.D) |
| | Sizing clearance | 6 mm |
| | Wind-up speed | 0.3 m/min. (10 g/min.) |
| (Injection sheet molding-conditions) | Molding temperature | 260° C. |
| | Mold temperature | 60° C. |
| | Injection pressure | 5 MPa |
| | Injection time | 20 seconds |
| | Cooling time | 30 seconds |
| | Mold dimension (mm) | 120 × 3 × 2 |

Properties of the moldings are shown in the following Table 3. It is evident from the results of Examples 3 and 7 that the dimensional stability and moldability can be improved by increasing the FPVE content of the fluorine-containing terpolymers.

TABLE 3

| Properties of Moldings | Example 3 | Example 7 | Comp. Ex. 3 |
|---|---|---|---|
| [Film] | | | |
| Film width (mm) | 118 | 106 | 95 |
| Film thickness | | | |
| Maximum (mm) | 0.45 | 0.43 | 0.40 |
| Minimum (mm) | 0.43 | 0.38 | 0.25 |
| [Tube] | | | |
| Tube outer diameter | | | |
| Maximum (mm) | 5.9 | 5.9 | 5.8 |
| Minimum (mm) | 5.9 | 5.7 | 5.5 |

TABLE 3-continued

| Properties of Moldings | Example 3 | Example 7 | Comp. Ex. 3 |
|---|---|---|---|
| Tube thickness | | | |
| Maximum (mm) | 1.0 | 0.8 | 0.8 |
| Minimum (mm) | 1.0 | 0.5 | 0.4 |
| [Injection sheet] | | | |
| State of the sheets | A | B | C |
| [Overall evaluation] | ○ | Δ | X |

Note)
State of the sheets
A: Neither surface exfoliation nor flow marks
B: Occurrence of surface exfoliation and flow marks in the region from the gate to the point by about 10 mm distant from the gate
C: Occurrence of surface exfoliation and flow marks in the region from the gate to the point by about 30 mm distant from the gate
The moldings had hazes due to resin fracture

INDUSTRIAL UTILITY

The present fluorine-containing terpolymer can give moldings with a good visible light and ultraviolet light transparency such as a light transmittance of 50% or more at 250 nm and 85% or more at 650 nm in the case of films molded to a thickness of 100μm and with a distinguished strength at ordinary temperature and at elevated temperatures when heated, such as a tensile strength at break of 1 MPa or more at 150° C., and thus can be used as suitable molding materials for films, sheets, tubes, etc., or antireflection films or optical fibers, etc.

Particularly, by making a comonomer ratio of perfluoro (propyl vinyl ether) to perfluoro(ethyl vinyl ether) 1.0 or more by weight, the side chain perfluoropropoxy groups can increase an interaction in the tetrafluoroethylene-perfluoro (ethyl vinyl ether) copolymer main chain, thereby improving the mechanical strength at room temperature and elevated temperatures. As to the transparency, the side chain perfluoropropoxy groups take part in the tetrafluoroethylene-perfluoro(ethyl vinyl ether) main chain to lower the crystalinity and enable production of moldings with an unexpected high light transmittance in addition to the proper light transmittance of the copolymer.

The invention claimed is:

1. A fluorine-containing terpolymer, which comprises 20–98% by weight of tetrafluoroethylene, 1–40% by weight of perfluoro(ethyl vinyl ether) and 1–40% by weight of perfluoro(propyl vinyl ether), wherein a comonomer ratio of the perfluoro(propyl vinyl ether) to the perfluoro(ethyl vinyl ether) by weight is 1.0 or more, said fluorine-containing terpolymer having specific melt viscosity of $0.1 \times 10^3 - 110 \times 10^3$ Pa·s (372° C.).

2. A fluorine-containing terpolymer according to claim 1, which has a glass transition temperature of 20° C. or higher.

3. A fluorine-containing terpolymer according to claim 1, which is obtained by solution-suspension polymerization.

4. Moldings molded from a fluorine-containing terpolymer according to claim 1, which have a light transmittance of 50% or more at 250 nm and 85% or more at 650 nm in the case of films having a thickness of 100μm.

5. Moldings molded from a fluorine-containing terpolymer according to claim 1, which have a tensile strength at break of 1 MPa or more at 150° C.

6. Films, sheets or tubes molded from a fluorine-containing terpolymer according to claim 1.

* * * * *